April 26, 1960    W. W. BARCIKOWSKI ET AL    2,933,856
GLASS BENDING MOLDS
Filed April 3, 1956
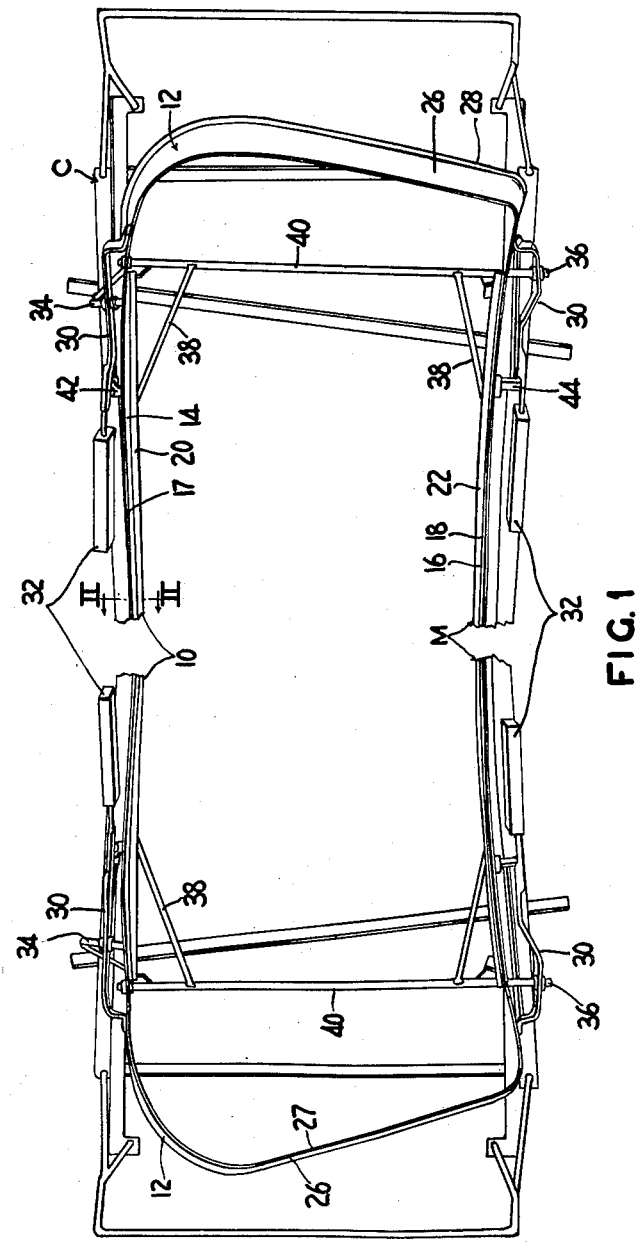
INVENTOR.
WALTER W. BARCIKOWSKI and
CHESTER W. SABOTKA
BY
Oscar L. Spencer
ATTORNEY United States Patent Office 2,933,856
Patented Apr. 26, 1960

2,933,856

GLASS BENDING MOLDS

Walter W. Barcikowski and Chester W. Sabotka, Creighton, Pa., assignors to Pittsburgh Plate Glass Company, Allegheny County, Pa., a corporation of Pennsylvania Application April 3, 1956, Serial No. 575,734

5 Claims. (Cl. 49—67)

The present application relates to glass bending molds. Specifically, this invention concerns sectionalized skeleton molds whose sections include rails of a novel reinforced construction.

Conventionally, flat glass sheets are bent into curved shapes by mounting them on sectionalized skeleton molds comprising frame-like molding members which are spread apart to receive flat glass sheets and are capable of moving into a closed mold position to form a substantially continuous frame conforming in elevation and outline to the curvature desired for the bent glass. The glass laden molds are conveyed through a tunnel-like lehr where the glass and the mold are heated uniformly to glass softening temperatures. At these temperatures, the glass softens and the mold moves into its closed position. The bent glass sheet is then annealed or tempered depending upon the article into which it is to be fabricated.

The sectionalized molds previously used comprised a central section including a pair of spaced rails curved to conform to the margins desired for the central portion of the glass sheet margins. These rails were interconnected by criss-crossing bracing members. The molds also included substantially U-shaped end molding members having an outline conforming to the shape desired for each extremity of the glass sheet and including criss-crossing reinforcing bracing members as reinforcing means. When glass is bent on sectionalized molds according to the conventional method described above, a pattern similar to that formed by the bracing members appears in polarized light in the bent glass sheets. This bracing pattern can be seen with the naked eye in certain situations when light reflected in a particular plane is transmitted through the bent glass sheet.

Other sectionalized molds have utilized reinforcing means immediately outside the mold shaping surface. A typical construction is shown in U. S. Patent 2,691,854 to Rugg. However, such molds have been found to be undesirable because the total mass of the outside frame, the structural braces between the mold sections and the bracing structure absorb a considerable portion of the lehr heat. This energy should be employed more efficiently to heat the glass sheet to be bent rather than wasted in heating the superuuous mass attached to the glass bending apparatus.

The present invention avoids the deficiencies recited above by providing novel reinforcement for the mold rails used in sectionalized glass bending molds. In order to minmize the additional mass of reinforcing metal typical of the prior art, the rail members are reinforced in a novel manner. This reinforcement may take the form of a reinforcing rod or bar attached to the bottom edge surface of each of the rail members and extending continuously substantially the entire length of the rail. Alternatively, the reinforcement may consist of a series of small elongated bars or rods extending in end to end relation and attached to the bottom edge surface of the rail. Since the upper edge surfaces of the rail provide the glass engaging surface for the mold, the reinforcements are spaced from the glass by the width of the mold rails. Their effect on the stress pattern in the glass is limited to the glass sheet margin which is hidden when the glass is mounted.

An object of the present invention is to improve sectionalized bending molds by providing improved reinforcement for the mold rails for the molding members, thereby substantially eliminating the necessity for the cross bracing members previously used.

Another object of the present invention is to provide sectionalized molds for bending glass sheets that combine a minimum of mass with a maximum of structural rigidity.

These and other objects will become apparent upon studying the description of a particular embodiment which follows. In the drawings which form part of the description.

Figure 1 is a plan view of a bending mold constructed according to the present invention mounted upon a mold support carriage and showing a portion of the mold in its open position at the left side of the drawing and in its closed position at the right side of the drawing.

Figure 2 is a cross-section taken along the lines II—II of Figure 1 showing one suggested construction for the reinforced rail.

Figure 3 is a cross-section similar to Figure 2 of an alternate construction for the reinforced rail.

Figure 4 is a fragmentary isometric view of another alternative construction for the reinforced rail.

Referring to the drawings, a glass bending mold for bending elongated glass sheets and shown generally at M, comprises a center molding section 10 and end molding sections 12. Center molding section 10 comprises a pair of spaced rails 14 and 16. Rails 14 and 16 have upper edge sunrfaces 17 and 18, respectively, that conform to the shape desired for the central portion of the longitudinal edges of the glass sheet. The rails extend longitudinally of the mold with their width dimension oriented vertically. A base portion 20 is spot welded to rail 14. Similarly, a base portion 22 is spot welded to the lower edge surface of rail 16 for reinforcement. The rails 14 and 16 and their base portion reinforcements 20 and 22 provide a construction having an inverted T cross-section.

The outboard molding members 12 each comprise substantially C-shaped rails 26 having upper edge surfaces 27 conforming in elevation and outline to the contour desired for a marginal extremity of the bent glass sheet. Reinforcing base portions 28 are attached to the bottom edge surfaces of the rails 26 to provide an inverted T in cross-section. Outboard rails 26 are substantially perpendicular across their width to the shaping surface desired for the local areas of the glass. Base portions 20, 22 and 28 constitute reinforcing members for the rails 14, 16 and 26, respectively.

A strap 30 is connected to each inboard extremity of each outboard molding member 12. A counterweight 32 is attached to the inboard extremity of each strap 30. Each strap 30 makes bearing contact with a stub rod 34 or 36. Stub rods 34 and 36 are connected to the outboard lateral surfaces of center mold rails 14 and 16, respectively. Brace rods 38 extend obliquely downwardly and longitudinally outwardly from the undersurface of the base portions 20 or 22 from their points of attachment with the end portions of rails 14 and 16 to connect with a cross rod 40. The latter in turn is mounted on the superstructure of a carriage C to support the mold thereon during its passage through a bending lehr. The brace rods 38 and cross rods 40 constitute the reinforcing means in the illustrative embodiment of the present invention.

Cross rod 40 serves to keep rails 14 and 16 at a proper lateral spacing and is preferably spaced a minimum of 3 inches below the glass engaging surface of the mold. If cross rod 40 is closer to the glass than 3 inches, the glass is liable to become subjected to a stress pattern reflecting the shape of the cross rod.

Tabs 42 and 44 extend outwardly from the center section rails 14 and 16 respectively to prevent the outboard molding members from rotating beyond the desired rotation. When the outboard molding members 12 rotate sufficiently with respect to center molding member 10, portions of the straps 30 abut the tabs 42 and 44, thus stopping the rotation.

Instead of reinforcing the rails comprising the sectionalized molds by means of reinforcing members in the form of bars 20, 22 or 28 shown in Figures 1 and 2 attached to the edge surface of the mold rails furthest removed from the glass, the reinforcing member can comprise an elongated rod 50 attached to the edge surface removed from the glass. An example of this type of reinforcing member is shown in Figure 3.

The mold M is used to bend glass sheets in the following manner. It is first loaded onto a mold support carriage C with cross rods 40 providing a fixed support for the center mold section 10 on the carriage. The outboard molding sections 12 are rotated into their spread positions to receive one or more sheets of flat glass. The flat glass sheets are sufficiently heavy to maintain the outboard molding sections 12 in their spread position while the sheets are rigid.

After the glass is loaded on the mold at the entrance of a tunnel-like glass bending lehr, the glass laden mold is conveyed on its mold support carriage through the lehr. During this movement, the glass and mold are subject to gradually increasing temperatures until the glass attains glass softening temperature.

Softening of the glass permits the counterweights 32 to rotate the outboard molding sections 12 about the stub hinges 34 and 36. This bending continues until the straps 30 engage the stop members 42 and 44. At this moment, the rails of the center and outboard molding sections provide a substantially continuous frame conforming in elevation and outline to the shape desired for the margin of the bent glass sheet. The glass laden mold is then removed from the region of glass softening temperature and either tempered by sudden chilling or annealed by gradual cooling.

For molds used to bend sheets for windshields, wherein the bent glass sheets are annealed, rails 14, 16 and 26 are preferably constructed of solid bands of 18-8 stainless steel alloy (18% by weight Cr, 8% Ni; balance Fe and impurities) ⅛ inch thick and 1½ inches wide. The reinforcing members 20, 22 and 28 for the rails are preferably formed of 18-8 stainless steel bars 3/16 inch thick and ½ inch wide welded to the bottom end of the rails. It is preferable to weld the reinforcing members at intervals of 4 inches to 6 inches along each bottom corner edge of the rails. The welds are preferably staggered on opposite side edges of the rails to improve the rigidity of the rails. Other irons used have been provided with reinforcing bars 20, 22 or 28 having a thickness of ¼ inch and width of ¾ inch welded to the bottom edge surface of the rails. If a rounded rod 50 is attached for strengthening, experience dictates using a rod of half inch diameter of 18-8 stainless steel.

The bars or rods may be coextensive in length with that of the rail they reinforce or each rail may be reinforced by a series of short bars or rods arranged in end to end relation. Molds of these types provide a substantially open area within the periphery formed by the glass engaging surface of the mold rails. This improved construction provides sufficient rigidity to prevent the mold rails from warping during use and also eliminates the necessity for the cross bracing or peripheral reinforcement heretofore found necessary.

The detailed description of certain embodiments of our invention is for illustration rather than limitation. The latter may be determined by studying the claims which follow.

What is claimed is:

1. A sectionalized glass sheet bending mold of the skeleton type constructed to have a minimum of mass combined with sufficient structural rigidity to prevent warpage during use at glass softening temperature and comprising molding sections, each having an upper shaping surface conforming to the ultimate shape desired for a different portion of a bent glass sheet; said molding sections being relatively movable between a spread position for supporting a flat glass sheet and a closed position wherein their upper surfaces provide a substantially continuous skeleton frame conforming in elevation and outline to the ultimate shape desired for the bent glass sheet; said molding sections comprising an edgewise disposed rail having end portions, an upper edge surface curved to form at least a portion of said molding section upper shaping surface and a bottom edge spaced from said upper edge surface; reinforcing means connected to said rail at its end portions only to reinforce the latter; and a longitudinally extending reinforcing member of greater transverse dimension than the thickness of said rail substantially coextensive in length with said rail and directly connected in contacting relation with the bottom edge of said rail to project beyond both side faces of the edgewise disposed rail; said rail, said reinforcing means and said longitudinally extending reinforcing member cooperating with one another to provide the rail with sufficient structural rigidity to support a glass sheet at glass softening temperature; the total combined mass of said reinforcing means and reinforcing member being less than the mass of an equivalent reinforcing means which would provide a like structural rigidity.

2. A sectionalized glass sheet bending mold of the skeleton type constructed to have a minimum of mass combined with sufficient structural rigidity to prevent warpage during use at glass softening temperature and comprising a plurality of molding sections including end molding sections and a center molding section; each molding section comprising an edgewise disposed rail having end portions, a curved upper edge surface conforming to the elevation and outline desired for a portion of the ultimate shape of the glass sheet and a bottom edge spaced from said curved upper edge surface; said end molding sections being movable relative to said center molding section between a spread mold position for supporting a flat glass sheet and a closed mold position wherein the upper edge surfaces of the molding section rails provide a substantially continuous frame conforming in elevation and outline to the ultimate shape desired for the bent glass sheet; the center molding section comprising a pair of spaced, longitudinally curved rails extending lengthwise of the mold; reinforcing means interconnecting the end portions only of each of said center molding section rails to reinforce the latter; and a reinforcing member of greater transverse dimension than the thickness of the rail directly connected in contacting relation with the bottom edge of each of said center molding section rails and substantially coextensive in length with each of said rails to project beyond both side faces of the edgewise disposed rails; said rails, said reinforcing means and said longitudinally extending reinforcing members of the center molding section cooperating with one another to provide the center section rails with sufficient structural rigidity to support a glass sheet at glass softening temperature; the total combined mass of said reinforcing means and reinforcing members of the center molding section being less than the masss of an equivalent reinforcing means which would provide a like structural rigidity.

3. The improvement according to claim 2, wherein the reinforcing member comprises an elongated bar secured to the bottom edge surface of the rail to provide therewith a construction having an inverted T cross-section for substantially its entire length.

4. The improvement according to claim 2, wherein the reinforcing member comprises an elongated rod secured to the bottom edge surface of each rail.

5. The improvement according to claim 2, wherein the reinforcing member comprises a series of elongated reinforcements extending in end to end relationship substantially the entire length of each rail.

References Cited in the file of this patent

UNITED STATES PATENTS

| 2,348,279 | Boyles et al. | May 9, 1944 |
| 2,633,673 | Bamford et al. | Apr. 7, 1953 |
| 2,688,210 | Jendrisak | Sept. 7, 1954 |
| 2,695,476 | Jendrisak | Nov. 30, 1954 |
| 2,758,422 | Jendrisak | Aug. 14, 1956 |

FOREIGN PATENTS

| 1,089,973 | France | Oct. 13, 1954 |

UNITED STATES PATENT OFFICE
CERTIFICATION OF CORRECTION

Patent No. 2,933,856                                   April 26, 1960

Walter W. Barcikowski et al.

It is hereby certified that error appears in the above numbered patent requiring correction and that the said Letters Patent should read as corrected below.

Column 1, line 50, for "construnction" read -- construction --; line 57, for "superuuous" read -- superfluous --; same column 1, line 62, for "minmize" read -- minimize --; column 2, line 35, for "sunrfaces" read -- surfaces --.

Signed and sealed this 25th day of April 1961.

(SEAL)
Attest:

ERNEST W. SWIDER                                 DAVID L. LADD
Attesting Officer                                    Commissioner of Patents